(12) United States Patent
Chase (10) Patent No.: US 10,724,472 B1
(45) Date of Patent: Jul. 28, 2020

(54) HIGH FLOW PLUG NOZZLE APPARATUS AND METHOD OF USING THE SAME

(71) Applicant: Aerion Corporation, Reno, NV (US)

(72) Inventor: James D. Chase, Reno, NV (US)

(73) Assignee: AERION INTELLECTUAL PROPERTY MANAGEMENT CORPORATION, Reno, NV (US)

( * ) Notice: Subject to any disclaimer, the term of this patent is extended or adjusted under 35 U.S.C. 154(b) by 297 days.

(21) Appl. No.: 15/626,012

(22) Filed: Jun. 16, 2017

(51) Int. Cl.
| | |
|---|---|
| *F02K 1/08* | (2006.01) |
| *F02K 1/34* | (2006.01) |
| *B64D 29/00* | (2006.01) |
| *F02K 1/06* | (2006.01) |
| *F02K 1/16* | (2006.01) |
| *F02K 1/15* | (2006.01) |

(52) U.S. Cl.
CPC ............. *F02K 1/08* (2013.01); *B64D 29/00* (2013.01); *B64D 33/06* (2013.01); *F02K 1/06* (2013.01); *F02K 1/085* (2013.01); *F02K 1/15* (2013.01); *F02K 1/16* (2013.01); *F05D 2220/80* (2013.01)

(58) Field of Classification Search
CPC ... F02K 1/06; F02K 1/08; F02K 1/085; F02K 1/15; F02K 1/16; F02K 1/17; B64D 33/06
See application file for complete search history.

(56) References Cited

U.S. PATENT DOCUMENTS

| | | | | | |
|---|---|---|---|---|---|
| 2,828,603 | A | * | 4/1958 | Laucher | F02K 1/08 60/761 |
| 3,060,679 | A | * | 10/1962 | Schmitt | F02K 3/11 60/224 |
| 3,273,338 | A | * | 9/1966 | Rimmer | F02K 1/17 60/235 |
| 4,085,583 | A | * | 4/1978 | Klees | F02K 3/075 60/204 |
| 4,244,294 | A | * | 1/1981 | Frignac | F02K 1/08 102/374 |
| 4,527,388 | A | * | 7/1985 | Wallace, Jr. | F02K 1/09 239/265.19 |
| 7,837,142 | B2 | | 11/2010 | Chase et al. | |
| 8,371,124 | B2 | | 2/2013 | Chase et al. | |
| 2004/0006969 | A1 | * | 1/2004 | Whurr | F02K 1/08 60/262 |

OTHER PUBLICATIONS

Maestrello, "Initial Results of a Porous Plug Nozzle for Supersonic Jet Noise Suppression," NASA TM-78802, 1978.
Bauer et al., "Jet Noise Suppression by Porous Plug Nozzles," NASA Contractor Report 3613, 1982.

* cited by examiner

*Primary Examiner* — Steven M Sutherland
(74) *Attorney, Agent, or Firm* — Pillsbury Winthrop Shaw Pittman LLP (57) ABSTRACT

The present disclosure relates to a method of operating a supersonic aircraft comprising the steps of: at takeoff, positioning a slidable plug-cowl assembly disposed within a nozzle and behind an engine in an aft position such that a front surface of a plug is aft of an exit plane of a cowl, to thereby reduce noise during takeoff and maintain engine efficiency; and after takeoff, re-positioning the slidable plug-cowl assembly to a forward position such that the front surface of the plug is not disposed aft the exit plane of the cowl.

12 Claims, 12 Drawing Sheets

HIGH FLOW PLUG NOZZLE APPARATUS AND METHOD OF USING THE SAME

BACKGROUND

A need exists to develop aircraft engine propulsion nozzles with reduced acoustic noise signatures for low speed operations around airports and the surrounding community. In 2007 more stringent FAR36 Stage 4 regulations for community noise standard were enabled which further restrict allowable noise emissions from aircraft. Currently more stringent "Stage 5" noise regulations are anticipated for new transport category aircraft making application for certification after 2017. Supersonic aircraft have more extreme challenges in meeting anticipated noise limitations than subsonic aircraft.

The major source of noise from aircraft is the high speed jet emanating from the exhaust nozzles of turbofan engines. Experimental work dating to the 1970's established the potential for high radius plug nozzles to reduce jet noise with relatively modest reductions in thrust efficiency, See "Initial Results of a Porous Plug Nozzle for Supersonic Jet Noise Suppression", by Maestrello, NASA TM-78802, 1978, and "Jet Noise Suppression by Porous Plug Nozzles" by Bauer, Kibens, and Wlezian, NASA Contractor report 3613, 1982.

One of the phenomena leading to reduced noise relative to a simple circular nozzle is the greater shear area relative to the thickness of the jet, leading to shorter mixing length between the high speed jet and the lower speed external flow passing around the outside of the nozzle and joining the jet at the exit plane. Much of the acoustic work on plug nozzles has focused on "porous" plugs which feature a hollow plug drilled with arrays of small holes, to suppress "screech" tones associated with shock cells of high pressure ratio supersonic aircraft nozzles. Test results also showed significant noise reductions with solid plugs at the lower pressure ratios associated with subsonic aircraft. The embodiments described herein use a different approach, though this different approach can be used in combination with such porous plugs.

A critical performance parameter for nozzles is the nozzle pressure ratio, which is the total pressure of the exhaust flow emanating from the engine divided by the ambient pressure surrounding the aircraft. Nozzle pressure ratios greater than unity will result in a net flow out through the exhaust nozzle. In order to create net thrust on the aircraft, the velocity exiting the nozzle system must be greater than the velocity entering the engine inlet, thus with increasing aircraft velocities the exhaust exit velocity must increase to create thrust, and requires higher nozzle pressure ratios with increased speed.

Figure 1:
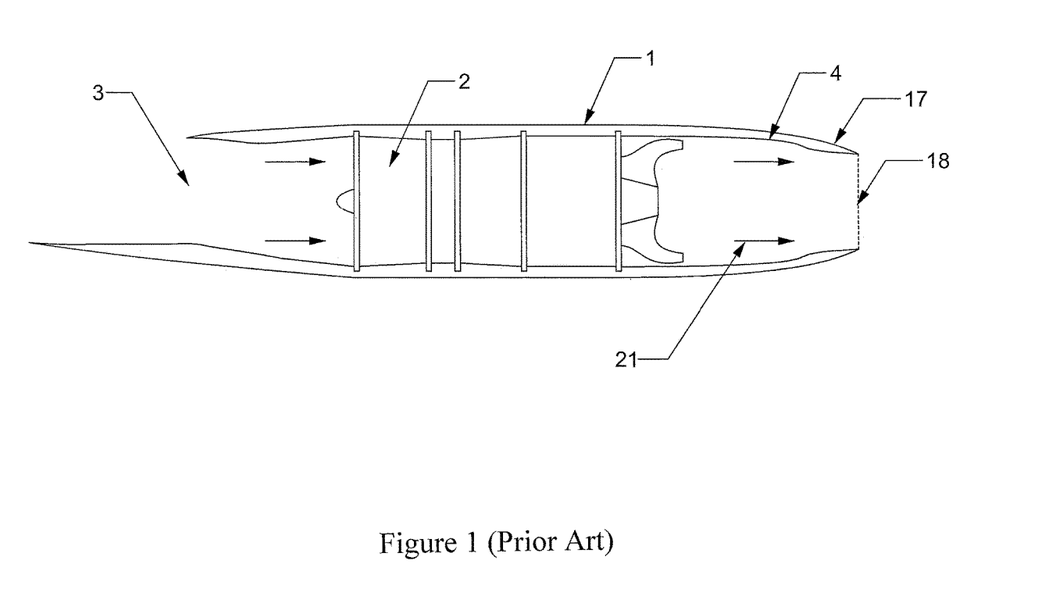
FIG. 1 illustrates a conventional convergent nozzle.

FIG. 1 is a cross-section view of a simple convergent nozzle common on subsonic aircraft consisting of an outer nacelle enclosing a turbofan or turbojet engine 2, air inlet 3, and exit duct 4. Exhaust flow 21 flows aft through the duct to exit through the nozzle exit 18. The minimum cross-section area 18 occurs near the exit plane of the nozzle 17.

A nozzle pressure ratio of approximately 1.9 corresponds with the speed of sound, at which point the flow will choke at the throat and the nozzle. Typical subsonic aircraft have nozzle pressure ratios (NPR) of less than 1.9 at takeoff conditions and thus are unchoked at those conditions. At higher speeds such as at a Mach 0.80 cruise condition, the nozzle pressure ratio rises to approximately 3 and the flow is choked at the throat. At supersonic conditions the nozzle pressure ratio must rise to much higher NPR, shock cells will form outside the nozzle and significant losses in nozzle thrust coefficient will occur, reducing the maximum ideal thrust that could occur.

Figure 2:
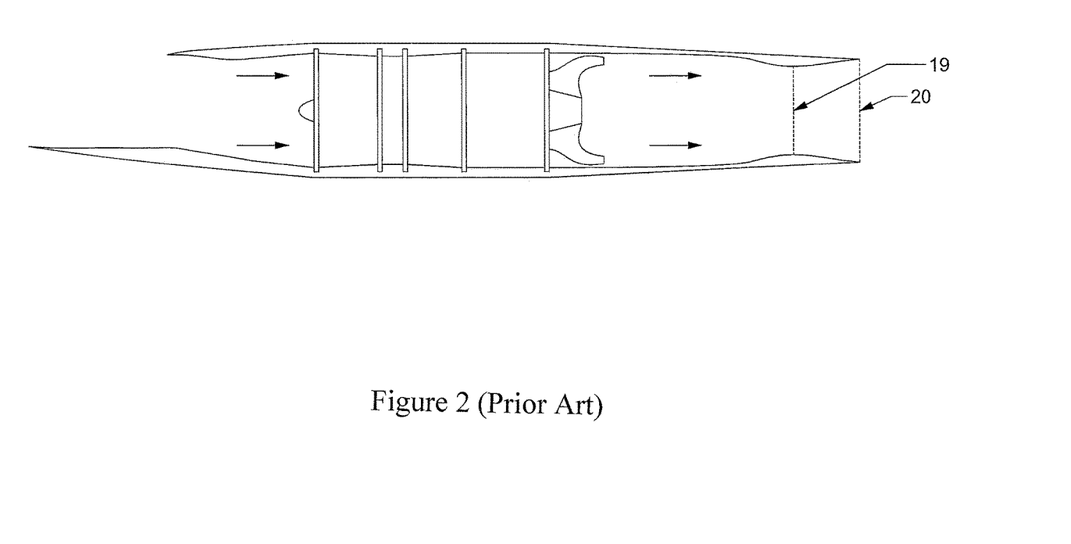
FIG. 2 illustrates a conventional Da Laval nozzle.

To achieve high thrust coefficient at high NPR, the nozzle must have some effective divergence, —a convergent-divergent (C-D) such as a De Laval nozzle shown in FIG. 2. Here the minimum throat section 19 is followed by an expansion section to an exit plane of greater area 20 allowing the additional expansion of supersonic flow to apply positive pressure to the diverging walls and allow more complete expansion and maximize thrust.

Figure 3:
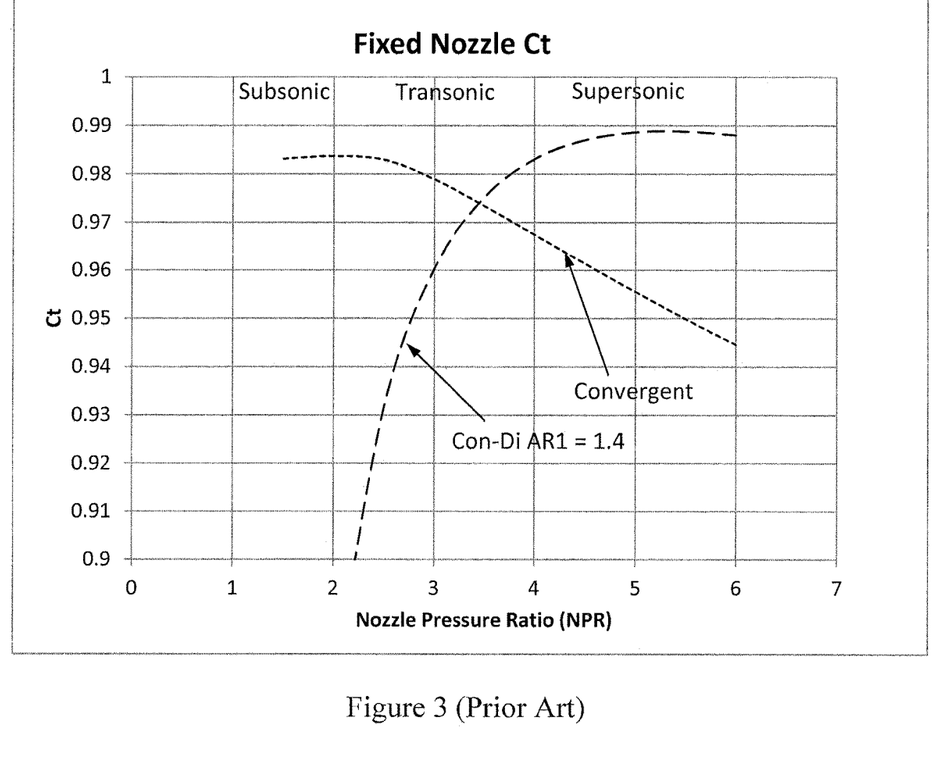
FIG. 3 illustrates a graph showing performance of conventional convergent and divergent nozzles.

The graph in FIG. 3 illustrates the performance of simple convergent and divergent nozzles. Ct or gross thrust coefficient is the ratio of thrust realized by the nozzle divided by the thrust obtainable with perfect ideal expansion. The ratio "AR1" represents the ratio of the divergent exit area 20 divided by the throat area 19. As seen, a simple convergent nozzle has high efficiency in the range needed for typical subsonic aircraft, but falls dramatically with the high NPR's required for supersonic flight. Conversely, the C-D nozzle has very poor efficiency at the low NPR's needed for takeoff and any subsonic conditions. In addition, at the low NPR's the simple fixed C-D nozzle will "overexpand" resulting in strong shock cells and very high jet noise.

Figure 4:
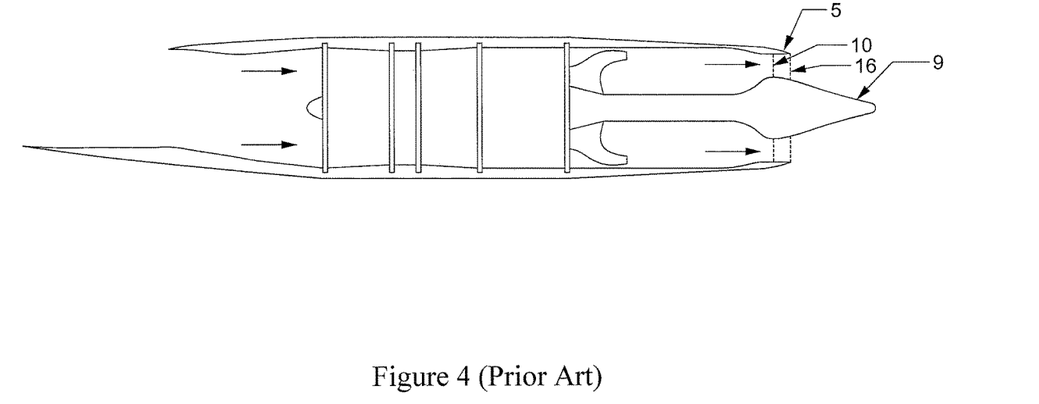
FIG. 4 illustrates a cross-section of a conventional plug nozzle.

FIG. 4 illustrates a cross-section incorporating a plug nozzle cross-section. Plug nozzles exhibit the characteristics of a convergent nozzle near and below critical NPR, and at high supercritical NPR the supersonic expansion would provide pressure on the external surface of the plug body and recover the additional thrust otherwise lost in a convergent nozzle. In the FIG. 5 graph below "AR1" represents the internal expansion ratio of area of the annulus between the nozzle cowl exit after subtracting the area of a fixed plug shown in FIG. 4 at the exit plane 16 and the minimum throat area 10 If the peak cross-section of the plug is coincident with the exit plane, AR1=1.0 and there is no internal divergence. "AR2" represents the total expansion ratio including the expansion occurring on the external plug surface aft of the cowl exit plane. It is prescribed as the total cross sectional area at the cowl exit plane 16 of FIG. 4 without the area of the plug subtracted divided by the minimum throat area 10 approximating effective divergence area ratio of an equivalent C-D nozzle.

Figure 5:
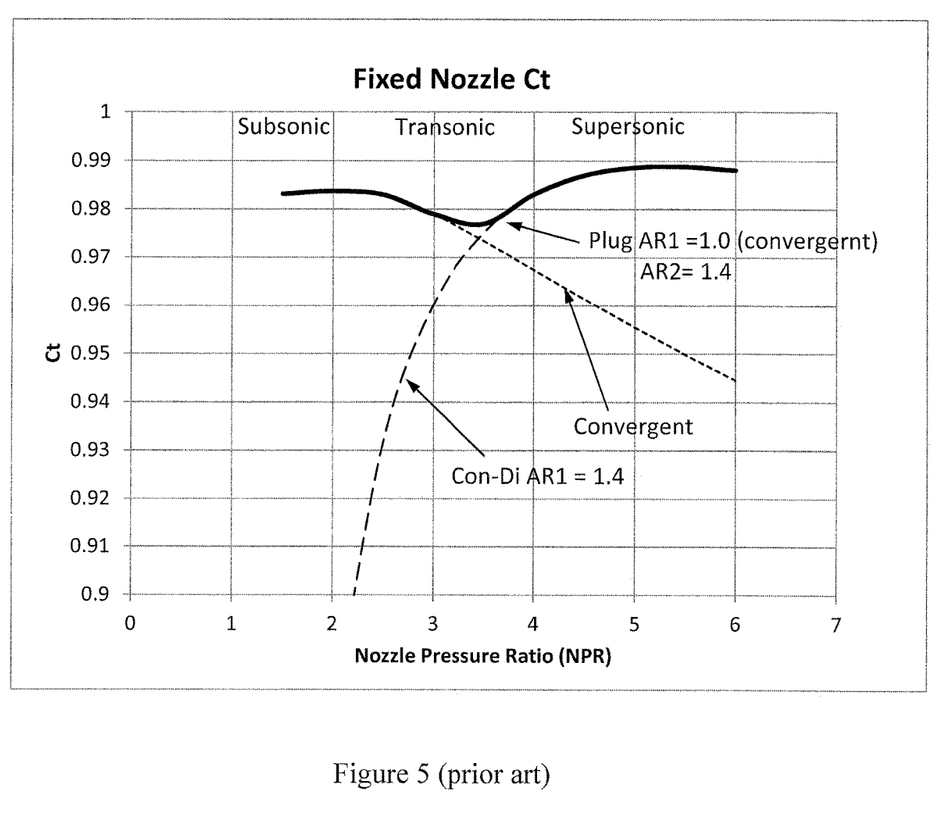
FIG. 5 illustrates a graph showing performance of conventional plug nozzle.

FIG. 5 illustrates the performance of a fixed plug nozzle such as in FIG. 4 with AR1=1.0 and AR2=1.4.

Supersonic aircraft usually need to change the basic minimum throat area for two reasons. First, at supersonic cruise the incoming airflow temperature rises and increases the power required to drive the fan and compressors without a requisite increase available for temperature limits in the engine. The result is with a fixed nozzle throat area the engine speed and airflow tends to "lapse" to lower values than the inlet is designed for. At supersonic speeds the excess flow approaching the inlet must either be bypassed (around the engine) or spilled ahead of the inlet. Supersonic spillage drag is excessive (beyond the small spillage needed for inlet stability), and a method to avoid it is to "high flow" the engine by increasing the nozzle throat area to induce 100% of nominal air flow through the engine at lower fan pressure ratio. The minimum throat area can be changed in a plug nozzle by appropriate shaping of the surfaces and sliding the plug horizontally into the cowl to increase the throat area. This variability can also be obtained by sliding the external cowl relative to the plug.

The first operational jet fighter ME-262 employed a sliding plug arrangement as part of the engine control, which used a sliding plug that slid into the cowl, to thereby allow "high flow" of the engine by increasing the nozzle throat area, as discussed above.

A more recent impetus for changing the throat area is to reduce external jet noise. Engines designed for efficient supersonic cruise generate very high jet velocities and noise if operated to their maximum airflow and pressure ratio. Reducing noise to acceptable levels requires reducing thrust levels and corresponding jet velocity. With a typical fixed nozzle, reducing thrust also reduces airflow. Since jet noise is dominated by jet velocity more than engine airflow, the minimum jet noise for a given thrust level will occur with the maximum airflow and minimum jet velocity available for a given engine design. This essentially means that for takeoff conditions low noise is also favored by "high flowing" the engine by increasing the airflow to the maximum and minimizing jet velocity to attain the necessary thrust. Increased nozzle exit area causes the fan flow to increase, and the fan pressure to decline, as the fan departs from its optimum "operating line". The nozzle exit velocity decreases in consequence of the lower fan pressure, resulting in the lower noise exhaust jet.

Figure 6:
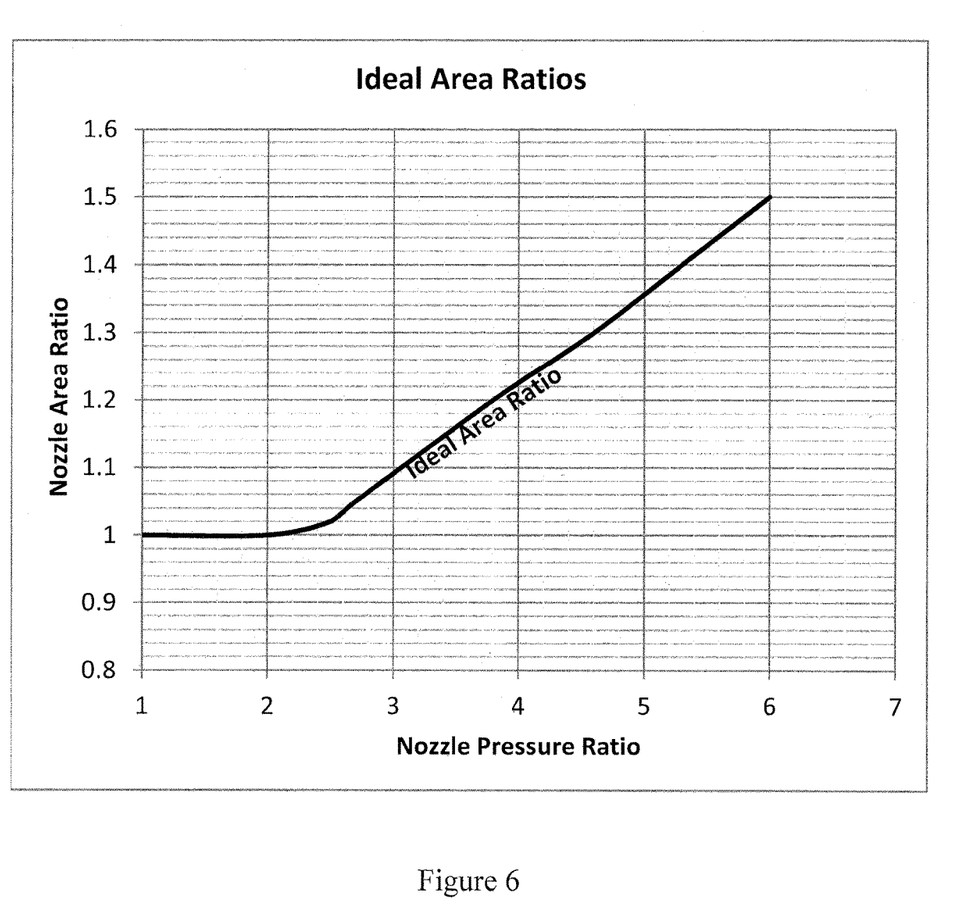
FIG. 6 illustrates a graph of ideal expansion ratio relative to nozzle pressure ratio.

As shown in FIG. 5, the typical fixed plug nozzle has a minimum thrust coefficient near NPR of 3, corresponding to the high subsonic and transonic speed regimes. This dip in the curve can be improved by applying a small divergence between the throat and the exit plane. The ideal expansion ratio versus NPR is illustrated in FIG. 6.

SUMMARY OF THE DISCLOSURE

The present disclosure relates to a method of operating a supersonic aircraft comprising the steps of: at takeoff, positioning a slidable plug-cowl assembly disposed within a nozzle and behind an engine in an aft position such that a front surface of a plug is aft of an exit plane of a cowl, to thereby reduce noise during takeoff and maintain engine efficiency; and after takeoff, re-positioning the slidable plug-cowl assembly to a forward position such that the front surface of the plug is not disposed aft the exit plane of the cowl.

In another aspect, the present disclosure relates to an apparatus for a supersonic aircraft engine assembly that emits airflow into the atmosphere for propulsion, the apparatus comprising: an engine that emits airflow for propulsion; an engine duct disposed aft of the engine that confines the airflow; a propulsion nozzle cowl disposed aft of the engine duct that receives the confined airflow and emits the confined airflow into the atmosphere; and a plug disposed within the nozzle; and wherein the plug and the propulsion nozzle cowl are slidable with respect to each other, such that in a first position a front surface of a plug is aft of an exit plane of a cowl and in a second position the front surface of the plug is not disposed aft the exit plane of the cowl.

BRIEF DESCRIPTION OF THE DRAWINGS

These and other aspects and features of the present disclosure will become apparent to those ordinarily skilled in the art upon review of the following description of specific embodiments of the disclosure in conjunction with the accompanying figures, wherein.

DETAILED DESCRIPTION OF THE PREFERRED EMBODIMENTS

Achieving a more ideal supersonic nozzle schedule that matches both the desired change in throat area and expansion ratio is problematic for the simplest sliding plug or sliding cowl geometries.

Creating the maximum throat area without any internal divergence is needed for low speed takeoff conditions. Sliding the plug from that position into the cowl to a minimum throat area ideal for subsonic and transonic conditions inevitably leads to an excessive internal expansion divergence ratio and reduced thrust for those conditions. The increased throat area needed for supersonic cruise can be met with further sliding into the nozzle and the expansion ratio can be ideal.

In short, the two ends of the spectrum—low noise takeoff and supersonic cruise can be met with ideal expansion ratios with the basic simple sliding plug geometry, but the subsonic and transonic conditions are necessarily compromised.

Figure 7:
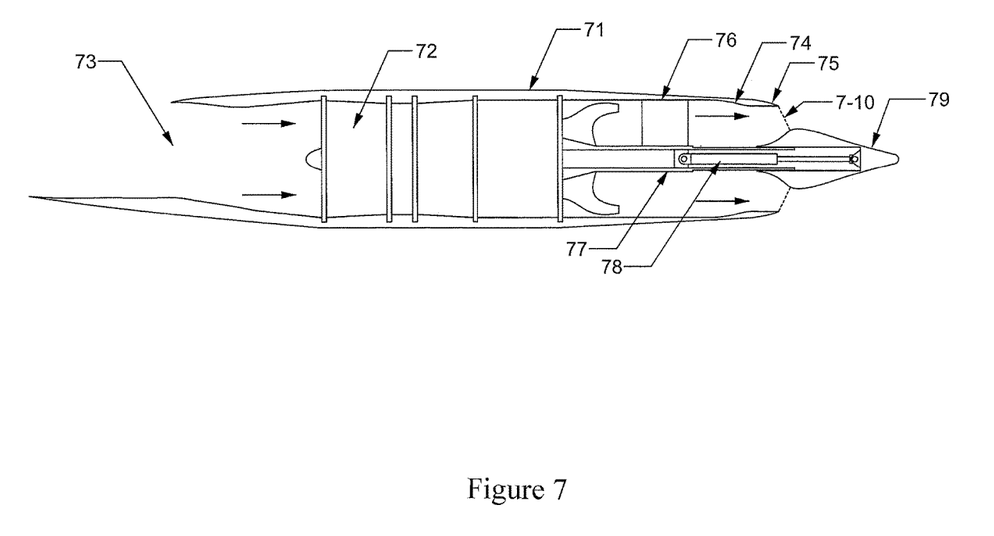
FIG. 7 illustrates one of the embodiments configured for supersonic conditions.
Figure 8:
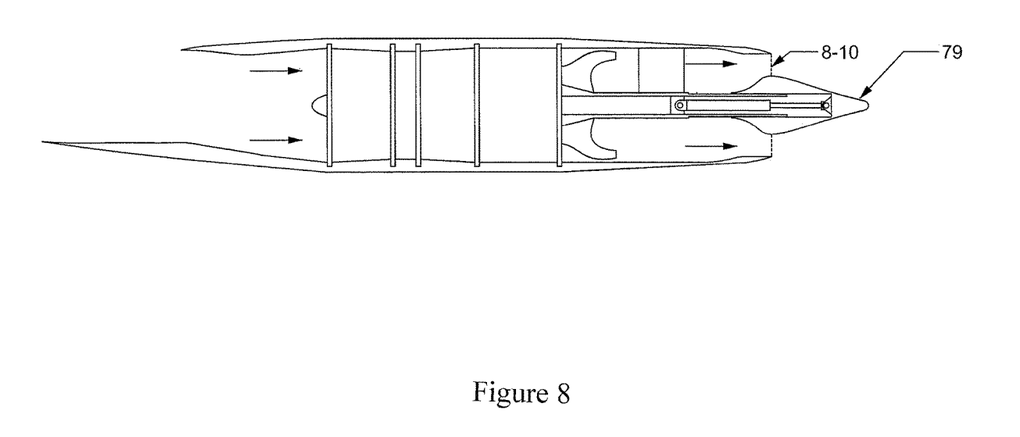
FIG. 8 illustrates the embodiment of FIG. 7 configured for subsonic conditions.

The invention described uses the basic sliding plug geometry, but slides the peak diameter of the plug outside of the cowl exit plane. This achieves the large throat area for takeoff with effectively a convergent nozzle for supersonic conditions as illustrated in FIG. 7, and a minimum throat area with ideal internal expansion ratio for subsonic conditions as illustrated in FIG. 8.

The described inventions are in the field of turbojet and turbofan engine propulsion nozzles. One embodiment is illustrated in FIG. 7, which is a cross-sectional view through a notional propulsion system.

The system is comprised of a nacelle 71 enclosing a turbojet or bypass fanjet engine 72, an engine air intake 73, an outer duct wall 74 and inner duct wall 77 forming a duct that conducts the engine exhaust to the propulsion nozzle cowl 75. A strut 76 supports the inner duct wall 77. A plug 79 having a front surface is situated within the nozzle cowl 75 to form a plug nozzle assembly. An actuator 78 effects a longitudinal translation of plug 79 from the most aft position as illustrated in FIG. 7 forward into the nozzle towards the engine (shown in FIG. 8). The inner surface 74 of the nozzle cowl 75 is so shaped such that the minimum area formed by the opening area 7-10 roughly perpendicular between the inner surface 74 and plug 79 may change as plug 79 slides towards the engine 72.

A principle unique feature is that the maximum cross-sectional area (approximately perpendicular to the flow direction) occurs aft of trailing edge of the nozzle cowl 75 when the plug 79 is slid aft. This effects an increase in the minimum flow area defined approximately by the surface area 7-10 of the annulus of the frustum of a cone between the nozzle cowl 75 and the forward surface of plug 79 when compared to the minimum flow area when the plug is slid forward to a position where the maximum perpendicular cross-sectional area 10' is co-planar with the trailing edge of nozzle cowl 5, as illustrated in FIG. 2.

The plug 79 position in FIG. 8 (which is in the slid forward position) is the most aft position used in prior sliding plug nozzle configurations and the minimum flow area 8-10, which is smaller than the minimum flow area 7-10 in FIG. 7. Note that FIG. 7 illustrates the plug 79 slid into the most aft position in contrast to FIG. 8.

The nozzle as illustrated is broadly typical of relative dimensions of practical nozzle design on a supersonic aircraft with moderate bypass ratio engines. The invention, however, is also applicable to subsonic turbojet and turbofan powered aircraft.

The actual dimensions of course would be tailored to the specific engine. The relative dimensions of the nozzle may deviate significantly from the figure, such as having a larger maximum plug dimension relative to the outer cowl diameter (called radius ratio on a typical axisymmetric design) to reduce noise. The length and cross-section shape of the plug may vary considerably for reasons such as reducing drag on the aircraft/nozzle combination, or reducing jet noise as described in U.S. Pat. No. 8,371,124 by Chase and Garzon, which patent is expressly incorporated by reference herein.

The nozzle is constructed of typical materials for nozzles appropriate for the temperature and strength required of the particular application, including but not limited to, titanium, stainless steel, refractory metals, high temperature composites or metal matrix composites.

Actuation is illustrated but not limited to a hydraulic cylinder actuator placed in the center duct that can be controlled electronically via the engine digital control with appropriate position Hydraulic lines and controls for the actuator in such an embodiment pass through the support strut or struts. External cooling air to maintain acceptable temperatures for the actuator is conducted through the support struts in one embodiment. Other actuation schemes could be utilized such as electric linear motion actuators, or electric motor driven actuators located outside the nozzle proper driving a shaft through a support strut with a rack and pinion gear arrangement. The change in areas could also be achieved by sliding the outer cowl relative to a fixed plug rather than sliding the plug relative to the cowl with actuation and bearing supports external to the nozzle assembly.

Figure 9:
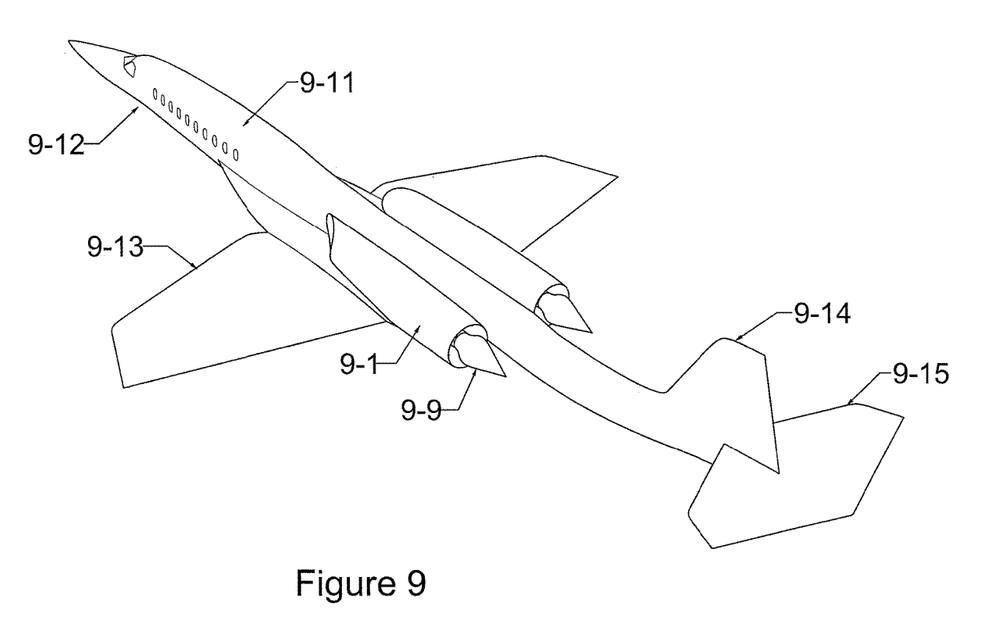
FIG. 9 illustrates an embodiment of a supersonic jet.

FIG. 9 illustrates a complete aircraft 9-11 according to a preferred embodiment, and includes fuselage 9-12, wing 9-13, nacelle 9-1, vertical stabilizer 9-14, horizontal stabilizer 9-15 and the sliding plug 9-9.

The geometry illustrated is a simple axisymmetric plug type nozzle sliding the plug to effect area changes. The identical principle can also be applied by sliding the outer cowl relative to a fixed plug. It can also be applied to the general family of external surface expansion nozzles such as the "SERN" 2-D single expansion ramp nozzles, non-circular plug and cowl cross-section shapes, and "bevel" type inside out nozzles as described in U.S. Pat. No. 7,837,142 by Chase and Garzon, which is expressly incorporated by reference herein.

Figure 10:
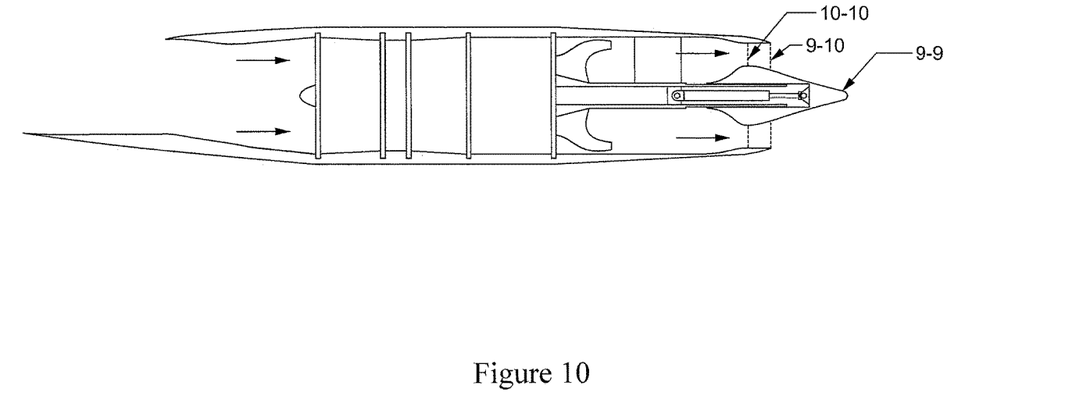
FIG. 10 illustrates one of the embodiments.

For transonic conditions the plug 9-9 slides further forward such that the minimum throat area 10-10 is maintained but the AR1 ratio is increased to a more ideal value as illustrated in FIG. 10 from the position 9-10 as illustrated in FIG. 10 when plug 9-9 is slid to the back position.

Figure 11:
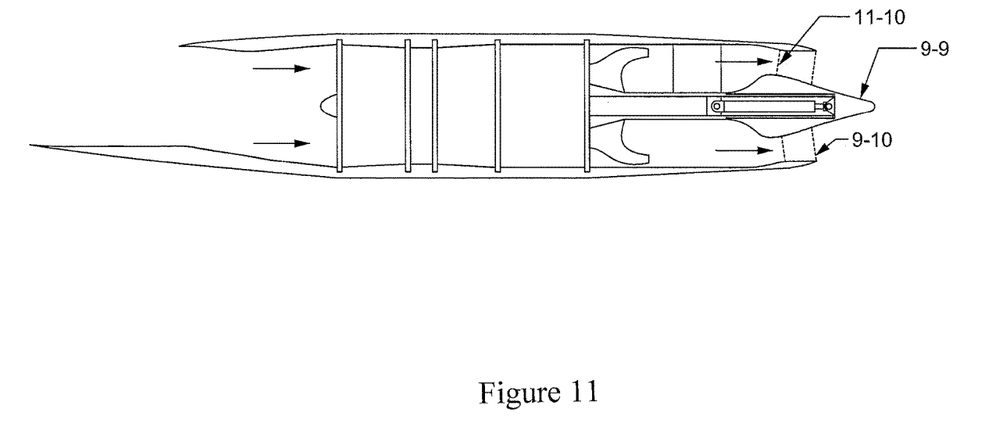
FIG. 11 illustrates one of the embodiments.

A combination of increased minimum throat area 11-10 and high expansion ratio (AR2) for supersonic cruise is effected by further forward sliding of the plug 9-9 into the nozzle, as illustrated in FIG. 11 in contrast to the back position 9-10 as shown.

Figure 12:
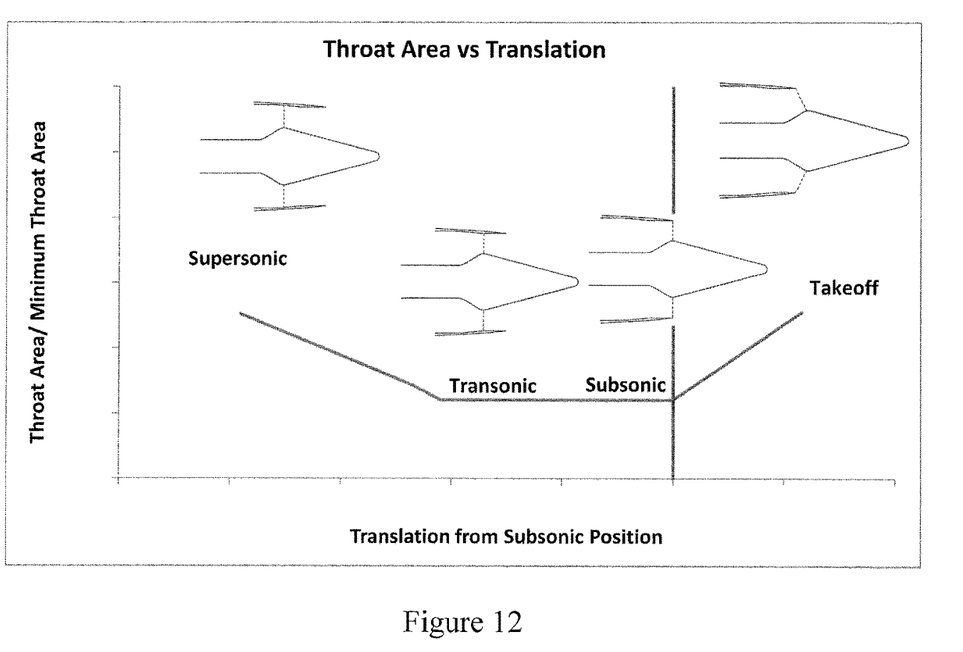
FIG. 12 illustrates throat area translation position.

The sliding of the plug outside of the cowl exit 7-10 as shown in FIG. 7 allows a large increase in minimum throat area for takeoff. A relatively constant minimum throat area section 8-10 and 10-10 respectively, for the intermediate position shown in FIGS. 8 and 10, allows an ideal internal expansion ratio for the subsonic and transonic conditions, and further translation into the cowl as shown in FIG. 11 allows an increased throat area and ideal expansion for "high flowing" at supersonic cruise. This is summarized in FIG. 12.

Although the present disclosure has been particularly described with reference to the preferred embodiments thereof, it should be readily apparent to those of ordinary skill in the art that changes and modifications in the form and details may be made without departing from the spirit and scope of the disclosure. It is intended that the appended claims encompass such changes and modifications.

What is claimed is:

1. A method of operating a supersonic aircraft comprising the steps of:
    at takeoff, positioning a slidable plug-cowl assembly disposed within a nozzle and behind an engine in an aft position such that a maximum cross-sectional area of a plug is aft of an exit plane of a cowl, to thereby reduce noise during takeoff and maintain engine efficiency; and
    after takeoff, re-positioning the slidable plug-cowl assembly to a forward position such that a front surface of the plug is not disposed aft the exit plane of the cowl.

2. The method according to claim 1 wherein the plug is a slidable plug and the cowl is fixed in position.

3. The method according to claim 2 wherein the re-positioning the slidable plug to the forward position after take-off results in the front surface of the slidable plug being disposed substantially aligned with the exit plane of the cowl.

4. The method according to claim 3 further including the step of further re-positioning the slidable plug to a further forward position that results in the front surface of the slidable plug being disposed forward of the exit plane of the cowl.

5. The method according to claim 1 wherein the re-positioning the slidable plug-cowl assembly to the forward position after take-off results in the front surface of the plug being disposed substantially aligned with the exit plane of the cowl.

6. The method according to claim 5 further including the step of further re-positioning the slidable plug-cowl assembly to a further forward position that results in the front surface of the plug being disposed forward of the exit plane of the cowl.

7. An apparatus for a supersonic aircraft engine assembly that emits airflow into the atmosphere for propulsion, the apparatus comprising:
    an engine that emits airflow for propulsion;
    an engine duct disposed aft of the engine that confines the airflow;
    a propulsion nozzle cowl disposed aft of the engine duct that receives a confined airflow and emits the confined airflow into the atmosphere; and
    a plug disposed within the propulsion nozzle cowl; and
    wherein the plug and the propulsion nozzle cowl are slidable with respect to each other, such that in a first position a maximum cross-sectional area of a plug is aft of an exit plane of a cowl and in a second position a front surface of the plug is not disposed aft the exit plane of the cowl.

8. The apparatus according to claim 7 wherein the plug is a slidable plug and the cowl is fixed in position.

9. The apparatus according to claim 8 wherein the slidable plug is configured for re-positioning the slidable plug to a forward position after take-off resulting in the front surface of the slidable plug being disposed substantially aligned with the exit plane of the cowl.

10. The apparatus according to claim 9, wherein the slidable plug is configured for re positioning to a further forward position that results in the front surface of the slidable plug being disposed forward of the exit plane of the cowl.

11. The apparatus according to claim 7 wherein, the plug is configured for re-positioning to the forward position after take-off resulting in the front surface of the plug being disposed substantially aligned with the exit plane of the cowl.

12. The apparatus according to claim 11, wherein the plug is further configured for re-positioning to a further forward position that results in the front surface of the plug being disposed forward of the exit plane of the cowl.

* * * * *